United States Patent [19]

Mercade

[11] 3,879,283

[45] *Apr. 22, 1975

[54] PURIFICATION OF QUARTZ CONTAMINATED CLAY BY SELECTIVE FLOCCULATION

[75] Inventor: Venancio V. Mercade, Metuchen, N.J.

[73] Assignee: Engelhard Minerals & Chemicals Corporation, Menlo Park, N.J.

[ * ] Notice: The portion of the term of this patent subsequent to Oct. 31, 1989, has been disclaimed.

[22] Filed: July 31, 1972

[21] Appl. No.: 276,578

Related U.S. Application Data

[63] Continuation-in-part of Ser. No. 85,284, Oct. 29, 1970, abandoned.

[52] U.S. Cl. .................... 209/5; 106/288 B
[51] Int. Cl. ............................... B03d 3/06
[58] Field of Search ........ 209/5, 166; 106/72, 288 B

[56] References Cited
UNITED STATES PATENTS

| | | | |
|---|---|---|---|
| 2,149,789 | 3/1939 | Samuel | 209/5 X |
| 3,418,237 | 12/1968 | Booth | 219/5 X |
| 3,439,802 | 4/1969 | Mallary | 209/166 |
| 3,462,013 | 8/1969 | Mercade | 209/166 X |
| 3,539,003 | 11/1970 | Bidwell | 209/5 |
| 3,596,760 | 8/1971 | Jacobs | 209/5 |
| 3,630,351 | 12/1971 | Uhinck | 209/5 |
| 3,701,417 | 10/1972 | Mercade | 209/5 |

FOREIGN PATENTS OR APPLICATIONS

| | | | |
|---|---|---|---|
| 106,890 | 6/1917 | United Kingdom | 209/5 |

*Primary Examiner*—Robert Halper
*Attorney, Agent, or Firm*—Melvin C. Flint; Inez L. Moselle

[57] ABSTRACT

To remove quartz impurity from kaolin clay, the impure clay is formed into a well-deflocculated aqueous slip. A source of polyvalent metallic cations and an anionic polyelectrolyte flocculant are added. The slip is mildly agitated until flocs of quartz form and settle out from the deflocculated slip of purified kaolin clay. The slip of purified clay is recovered.

7 Claims, No Drawings

1

PURIFICATION OF QUARTZ CONTAMINATED CLAY BY SELECTIVE FLOCCULATION

RELATED APPLICATIONS

This application is a continuation-in-part of my co-pending application, Ser. No. 85,284, filed Oct. 29, 1970 now abandoned.

BACKGROUND OF THE INVENTION

Certain kaolin clays, especially primary clays, are contaminated with a quartz impurity. When more than a trace of quartz is present, the clay may be unsuitable for certain uses, such as a paper coating pigment, since quartz is abrasive. Furthermore, quartz lacks the optical properties which contribute to the utility of the kaolin as a pigment and, when present in significant amount, quartz impairs the properties of a clay coating.

When the quartz impurity differs significantly in size from the kaolinite particles, separation of the minerals may be effected by controlled sedimentation. However, when the bulk of the quartz and clay particles are ultrafine, e.g., finer than 5 microns, great difficulty is experienced when attempts are made to effect a separation. Since and quartz and clay are both siliceous and have similar flotation properties, selective flotation methods are generally ineffective.

PRIOR ART

In Canadian Pat. No. 838,573, there is described a method for removing quartz from clay. A mixture of quartz and clay is formed into a deflocculated aqueous suspension and the clay is selectively flocculated by adding certain metallic salts to provide a concentration of metallic ions with the range of 0.001 × $10^3$ to 1.0 × $10^3$ gram ions/liter (about 0.001 p.p.m. to 1 p.p.m.) and an anionic acrylic polymer in amount of at least 0.005 percent based on the weight of the solids. The system is vigorously agitated, whereby the clay particles form flocs and the quartz remains in suspension. This general technique suffers from the drawback that the organic polymeric additive and the added metallic ions concentrate with the clay flocs, thereby contaminating the clay. Furthermore, it is obviously more desirable from the standpoint of recovery to flocculate the constituent present in minor proportion, e.g., a quartz impurity in clay, than it is to flocculate the major constituent, e.g., clay.

THE INVENTION

An object of the invention is to provide a method for removing ultrafine quartz impurity from kaolin clay in a manner such that purified clay is recovered substantially uncontaminated by reagents used to effect the separation.

A specific object is to provide a method for selectively flocculating finely divided quartz impurity from kaolin clay and separating the purified clay from the flocced impurity.

Further objects and features will be apparent from a description of the invention which follows.

Briefly stated, in accordance with this invention, fine quartz impurity is removed from kaolin clay by forming the impure clay into a welldeflocculated neutral or mildly alkaline aqueous suspension and adding thereto, as separate additions, a source of polyvalent metallic cations, preferably calcium ions, to provide a metallic ion concentration of at least 10 p.p.m. but insufficient to flocculate constituents of the suspension and a small amount of water-soluble anionic polymeric flocculating agent in amount sufficient, in combination with the source of polyvalent cations, to flocculate selectively the quartz without appreciable flocculation of the clay, then mildly agitating the suspension until flocs form and separating the suspension of clay from the flocs in which the quartz impurity is concentrated.

From this brief description, it may be seen that the desired selective flocculation of clay rather than quartz, such as was achieved by the prior art technique, results from a combination of steps which represent departures from the practice of the prior art method discussed hereinabove. In the process of the invention a significantly higher concentration of metallic cations is provided and mild agitation is employed instead of the vigorous agitation that is used in the prior art method. Generally, less anionic polymer is employed in practicing the method of the invention.

DESCRIPTION OF THE INVENTION

The method of the invention is applicable to the purification of clay containing small or relatively large amounts of quartz impurity (e.g., clay containing 2 percent to 50 percent by weight quartz). The process is of especial benefit when all or a substantial proportion of both the quartz and the clay is finer than 5 microns (equivalent spherical diameter). The clay may contain other impurities which may or may not be removed along with the quartz, depending upon the nature of the impurity. Thus, for example, titania, iron oxides and calcite impurities may in some cases be removed along with the quartz when such impurities are also present.

The impure clay must first be formed into a dilute well-deflocculated slip or suspension whereby both the clay and impurities are deflocculated. Normally grit (e.g., plus 325 mesh matter) is removed before selectively floccing the quartz impurity although this is not essential since the grit may be removed along with the flocculated impurities obtained in subsequent processing. Unfractionated clay or fine or coarse size fractions of degritted clay may be processed. In a presently preferred embodiment a deflocculated slip of unfractionated degritted clay is employed and a fine size fraction of purified clay is recovered after impurities are selectively flocculated therefrom.

Sodium silicate or hydrosols obtained by mixing small amounts of salts of polyvalent metal with sodium silicate have been used with success as deflocculants in the process of the invention. Other clay deflocculants include sodium hydroxide, sodium carbonate, ammonia and sodium salts of condensed phosphates. Mixtures of deflocculants may be used. Sufficient deflocculating agent should be present to maintain minus 2 micron clay particles in essentially permanent suspension.

Recommended is the formation of deflocculated slips containing 3 percent to 20 percent clay solids and having pH values within the range of 7 to 10, preferably a pH within the range of 8.0 to 9.5. When the pH is too low, it may be difficult to maintain the clay particles in the required deflocculated condition during the purification treatment and clay recovery will be adversely affected. On the other hand, the flocculation of quartz may be hampered when pH is too high and insufficient separation of quartz will result.

The source of polyvalent cations may be added before or after the synthetic organic polyelectrolyte is incorporated into the pulp. The source of the polyvalent cations must be one which is sufficiently ionized in the slip to supply an adequate concentration of polyvalent cations. Examples of polyvalent cations are calcium, magnesium, barium, zinc, lead, iron (ferrous and ferric), aluminum, titanium, manganese (manganous and manganic). Oxides, hydroxides and salts of polyvalent metals may be used provided they possess adequate solubility in the deflocculated slip. Metallic salts of monobasic acids, especially monobasic mineral acids and acetic acid, are preferred. Calcium chloride is especially recommended. The optimum concentration of polyvalent metallic cation varies with the species of polyanionic flocculant that is used and it also varies with the concentration of the polyanionic flocculant. Generally, the concentration of polyvalent cation is within the range of 10 to 200 p.p.m., more usually 40 to 100 p.p.m. Good results have been realized when employing a weight ratio of polyvalent cation to anionic polymer within the range of about 25 to 100/1.

It is preferable to add the source of polyvalent metal cations to the deflocculated slip in the form of a dilute aqueous solution, e.g., a solution of ¼ to 2 percent concentration. After addition of such solution the slip should be thoroughly agitated to assure uniform mixing. High shear mixing is suitable unless the synthetic organic polymer has been already incorporated into the pulp. It is believed that the polyvalent cations are selectively adsorbed by the quartz impurity, thereby reducing zeta potential and facilitating flocculation by the high molecular weight anionic polymer.

In addition to the source of polyvalent metallic cations, a water-soluble anionic organic polyelectrolyte having an average molecular weight greater than 10,000 is incorporated into the slip as a dilute (e.g., 0.01 percent to 0.5 percent) aqueous solution. The term "anionic organic polyelectrolyte" as used herein encompasses synthetic organic polymers which, when placed in an aqueous medium, ionize on the polymer molecule into a substantial number of anionic groups distributed at a plurality of positions on the molecule. Present experience indicates that the polymer should be a weakly anionic polymer rather than a strongly anionic polymer. Weakly anionic polymers contain both anionic and nonionic groups. In this case, anionic properties are imparted to synthetic organic polymers by the presence of side chains of carboxylic acid, carboxylic anhydride and carboxylic acid salt groups. Nonionic groups in a side chain in the polymer result from the presence of one or more of the following hydrophilic groups: carboxylic acid amide, carboxy alkyl ester, pyrrolidone, hydroxy, hydroxy alkyl ether and alkoxy. Preferred because of their commercial availability are high molecular weight weakly anionic synthetic polyacrylamides containing some replacement of amide by carboxylic groups. Such polyelectrolytes are prepared by copolymerization of acrylamide and acrylic acid or by the partial hydrolysis of polyacrylamide. Reference is made to "POLYELECTROLYTE ADSORPTION OF KAOLINITE," A. S. Michaels and O. Morelos, INDUSTRIAL AND ENGINEERING CHEMISTRY, VOLUME 47, No. 9, page 1802, for a detailed description of a method for synthesizing hydrolyzed polyacrylamide (PAM) and for controlling the extent of partial alkaline hydrolysis.

An extremely low concentration of anionic polymeric flocculant is required to flocculate selectively the impurities in the slip of clay. Generally a concentration within the range of ¼ to 5 p.p.m., preferably ¾ to 4 p.p.m., suffices. When the concentration of polyelectrolyte ie too low, or when the ratio of polyelectrolyte to metallic cations is too low, flocculation is inadequate. In extreme cases, no fluccules form. When the concentration exceeds a desired value, the recovery of purified clay is impaired. At excessive concentrations there may be no selectivity since both the clay and the impurities will be flocculated. An optimum amount or range of synthetic organic polyelectrolyte can be readily determined by routine experimentation.

The pH of the slip may be reduced to a desired value by addition of an acid or acid salt before or after incorporating the synthetic organic polyanionic flocculating agent.

After a solution of synthetic organic polyanionic flocculant has been thoroughly mixed with the slip containing deflocculated clay and impurities, it is usually important to avoid vigorous agitation which will break up flocs and/or degrade the polyanionic substance. However, agitation should be sufficient to maintain the deflocculated clay particles in suspension while the flocs are forming. This mild agitation is continued at least until a visible sediment forms. In most instances floc formation and sedimentation occurs within ten minutes after incorporating both the source of polyvalent cations and the polyelectrolyte. After the sediment forms, the slip may be aged under quiescent conditions or under mild continuous or intermittent agitation to assure that the finer flocs have time to settle. Settling periods up to 48 hours or longer are suitable.

The slip of deflocculated purified clay is separated from the flocs by any suitable means such as decantation, siphoning, centrifuging, filtering. Combinations of such separation techniques may be employed. When the slip containing the flocs is quiescently aged before separation, it may be desirable to resuspend any particles of sedimented coarse clay before attempting to separate the slip from flocculated impurities.

When high clay recovery is desired, a portion of the clay that is entrapped in the flocs may be recovered by diluting the flocs with water, gently agitating the diluted flocs and decanting or otherwise removing the supernatant containing suspended clay.

Further removal of quartz and other impurities in the deflocculated slip of beneficiated kaolin may be effected by repeating the treatment with polyvalent metal cation and polyelectrolyte. As an alternative, the slips may be further purified by froth or other flotation or by high intensity wet magnetic separation.

When processing unfractionated kaolin clay or degritted unfractionated purified clay, the slip of purified clay may be fractionated by conventional means such as sedimentation or centrifugation to recover one or more fine size fractions. Fractionation normally results in a high brightness fine size fraction and a coarse size fraction which may be less bright than the fine size fraction but which is usually brighter than a course size fraction obtained by fractionating the unpurified whole clay.

Removal of quartz usually effects a marked increase in clay brightness. In some cases it may be essential or desirable to further brighten the purified clay or a desired size fraction of the purified clay by chemical bleach or bleaches. The bleach reagent that is employed will depend on the nature of the residual impurities in the clay and may be a strong oxidizing agent, a strong reducing agent or combinations thereof. Normally the slip of purified clay is flocculated by addition of an acid or acid salt, and thickened by removal of water before bleaching.

The invention may be more fully understood by the following illustrative examples.

In the examples all parts are on a weight basis unless otherwise indicated. Brightness values represent results obtained by TAPPI Standard Method I-646 m-54, described in TAPPI, October 1954, pages 159–160A. In the examples all proportions are expressed on a weight basis unless otherwise indicated. The percentages of quartz and kaolinite in products were estimated from relative peak intensities on X-ray powder diffraction patterns. These patterns were obtained by Cu-alpha techniques, using Cualpha X-radiation.

The clay used in the test was a primary white clay from Milos, Greece.

A sample of the clay was blunged in water at 40 percent solids. The pH was 7.1. The blunged clay was dispersed by adding dry sodium carbonate (0.6 lb./ton), agitating and then adding a hydrosol obtained by diluting "O" sodium silicate solution (38 percent solids, $SiO_2/Na_2O$ mole ratio of 3.2/1) to 5 percent and mixing with a 1 percent solution of alum. The amount of hydrosol added corresponds to 4.0 lb./ton "O" solution and 0.32 lb./ton alum. After addition of the hydrosol and mixing, the pH was 8.7. Grit was removed from the dispersed slip by passing it through a 325 mesh (Tyler) screen. The minus 325 mesh slip was recovered, diluted to 5 percent solids and used in the test to be described. An X-ray pattern of a sample of the solids in the minus 325 mesh slip was obtained; this material was found to contain about 34 percent quartz.

A 4,000 gram sample of the 5 percent slip (containing 200 gm. dry clay) was agitated for 5 minutes in a Fagergren flotation cell which was operated with the air inlets closed. The cell provided intensive high shear agitation. A 0.1 percent aqueous solution of $CaCl_2 \cdot 2H_2O$ was added in amount of 160 ml. and the slip was agitated for 1 minute. The calculated $Ca^{++}$ concentration was 42.3 mg./liter (42.3 p.p.m.). A 0.01 percent solution of "Polyhall M-59" was incorporated into slip in amount of 40 ml., providing a polymer concentration of 1.06 mg./liter (.002 percent, based on the clay weight). The suspension was agitated in the Fagergren cell (air inlets still closed) for 1 minute. The pH was 8.85.

The contents of the Fagergren cell were then removed to a container providing means for agitating the suspension more gently (a Lightnin' Mixer operated at low speed). The suspension was gently agitated for 30 minutes.

The suspension was then divided into five equal portions (about 800 cc.) which were maintained quiescent for various periods of time.

One portion of the treated suspension was allowed to settle for 67 minutes. This sample separated into two distinct white phases — an upper apparently well-dispersed slip and a sediment. The sedimented fraction accounted for 81 percent of the solids (the solids remaining in suspension accounting for 19 percent). The deflocculated clay contained an estimated 5 percent quartz. Since the minus 325 mesh feed contained about 34 percent quartz, it is apparent that quartz had been selectively flocculated. This was confirmed by differences in brightness between the flocculated fraction and the fraction which remained deflocculated. Thus, the solids in the minus 325 mesh starting slip had a G.E. brightness of 91.2 percent, whereas the solids in the sediment obtained by selective flocculation of the quartz had a brightness of only 89.0 percent and the purified clay which reported in the deflocculated slip had a brightness of 94.1 percent. Thus, selective flocculation not only decreased the quartz content of the clay but it also brightened the clay to a significant extent.

I claim:

1. A method for purifying kaolin clay containing from 2 to 50 percent by weight of a finely divided quartz impurity which comprises dispersing said impure clay in water to form a dispersed clay slip having a pH in the range of 8.0 to 9.5, separately incorporating therein a soluble compound containing polyvalent metal cations in amount to provide a concentration of polyvalent metal cations in the range of 10 p.p.m. to 200 p.p.m. and insufficient to flocculate the slip and from ¼ to 5 p.p.m. of a water-soluble synthetic organic weakly anionic polyacrylamide flocculant, said amount of polyacrylamide flocculant being sufficient, in combination with said source of polyvalent cations, to flocculate selectively a substantial amount of the finely divided quartz impurity, agitating the slip mildly until flocs of quartz form and settle to the bottom of the slip and separating the flocs from the slip of purified clay.

2. The method of claim 1 wherein said polyvalent cations are divalent.

3. The method of claim 2 wherein said polyvalent cations are calcium ions.

4. The method of claim 3 wherein the calcium ion concentration is within the range of 40 to 100 p.p.m. and the polyacrylamide concentration is within the range of ¾ to 4 p.p.m.

5. The method of claim 3 wherein the source of the calcium ions is added to the slip before adding said polyacrylamide.

6. The method of claim 3 wherein the weight ratio of calcium ions to polyacrylamide is within the range of 25 to 100/1 and calcium chloride is the source of the calcium ions.

7. The method of claim 1 wherein the clay is deflocculated with a reagent comprising sodium silicate.

* * * * *